United States Patent Office 3,297,424
Patented Jan. 10, 1967

3,297,424
METHOD FOR CONTROLLING THE GROWTH OF FUNGI AND PLANTS
Dale R. Dill, Webster Groves, Mo., assignor to Monsanto Company, a corporation of Delaware
No Drawing. Original application Sept. 21, 1962, Ser. No. 225,367, now Patent No. 3,255,194, dated June 7, 1966. Divided and this application May 20, 1965, Ser. No. 470,285
4 Claims. (Cl. 71—2.5)

This invention relates to novel amine derivatives of o-benzyl-p-chlorophenol and the acid salts thereof. More particularly, this invention is concerned with the condensation products of a selected heterocyclic secondary amine, formaldehyde, and o-benzyl-p-chlorophenol. Such products are found to possess useful and unexpected pesticidal activity, particularly as herbicides and fungicides.

The present application is a division of United States Serial No. 225,367, filed September 21, 1962, now U.S. Patent No. 3,255,194, granted June 7, 1966.

The term "pesticide," as used herein, connotes compounds useful as active ingredients in biological toxicants such as one or more of the following: bactericide, fungicide, insecticide, nematocide, and herbicide.

It is an object of this invention to provide new amine derivatives of o-benzyl-p-chlorophenol and the acid salts thereof.

A further object of this invention is to incorporate said derivatives in formulations which display pesticidal activity, particularly as herbicides and fungicides.

The novel compounds of this invention have the general formula,

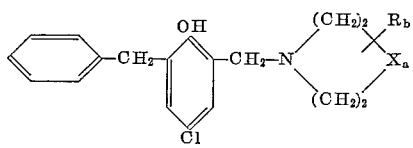

where R is selected from the group consisting of methyl and ethyl, $b$ is an integer from 0 to 2, X is selected from the group consisting of oxygen, N—CH$_3$ CH$_2$, and $a$ is an integer from 0 to 1.

This class of compounds can be prepared by the condensation reaction of a selected heterocyclic secondary amine with formaldehyde, or a formaldehyde-yielding substance, and o-benzyl-p-chlorophenol. The reaction of an amine, formaldehyde, and a phenol is known as the Mannich-type reaction. The details of the Mannich reaction have been set forth in many texts, one of which is Organic Reactions, volume I, pages 303 et seq., b Adams, Bachman, Fieser, Johnson and Snyder. Briefly, the Mannich reaction involves the condensation of ammonia, or a primary or a secondary amine, with formaldehyde and a compound containing at least one reactive hydrogen. In the present invention, the compound having the reactive hydrogen is a substituted phenol, o-benzyl-p-chlorophenol.

The following equation is representative for preparing the compounds of the present invention:

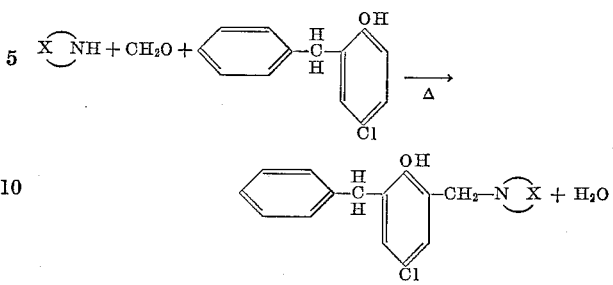

where

represents a heterocyclic secondary amine having each of the N ring bonds attached to a carbon atom.

As illustrative of the heterocyclic secondary amines, but not limitative thereof, are: morpholine, 2-methyl-5-ethylmorpholine, 2,3-dimethylmorpholine, piperidine, 2-methylpiperidine, 4-ethylpiperidine, 3 - ethylpiperidine, piperazine, 2 - ethylpiperazine, 3 - methylpiperazine, N-methylpiperazine, 2,3 - diethylpiperazine, pyrrolidine, 2-methylpyrrolidine, 3-ethylpyrrolidine, 2-ethyl-4 - methylpyrrolidine, 3,4-dimethylpyrrolidine, and the like. The mono and dihydrochloride salts of the compounds prepared with these amines are also useful as described above.

In performing the Mannich condensation, the formaldehyde may be added as an aqueous solution or as paraformaldehyde. When aqueous formaldehyde is utilized, the condensation is ordinarily carried out with stirring in an aqueous medium. If paraformaldehyde is utilized, an inert solvent is preferred. The inert solvent selected should not be capable of undergoing the Mannich condensation unless it is one of the reactants, in which case an excess thereof may be used. Examples of some of the inert solvents which do not undergo the Mannich condensation are ethanol, isopropyl alcohol, isoamyl alcohol, benzene, toluene, xylene, and the like.

In the preparation of the compounds of this invention, it is preferred to employ an excess of formaldehyde and the heterocyclic secondary amine. An excess of formaldehyde and the secondary amine ranging from 1.005 to 1.15 molar equivalents (preferably about 1.1 molar equivalents) provides excellent yields.

The nature of this invention will be more fully understood by reference to the following examples, which are set forth herein solely for the purpose of illustration and are not to be construed as limiting the scope of the present invention.

EXAMPLE I

*2-benzyl-4-chloro-6-pyrrolidinylmethylphenol*

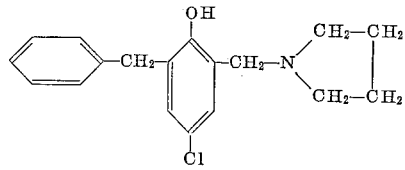

To a suitable reactor there are added 43.8 grams (0.2 mol.) of o-benzyl-p-chlorophenol, 6.6 grams (0.22 mol.) of paraformaldehyde, 15.6 grams (0.22 mol.) of pyrrolidine, and 75 ml. of absolute ethyl alcohol. The reaction mixture is heated to gentle reflux and held there for 18 hours. The reaction mixture, while hot, is poured over ice, causing a fraction of the reaction mixture to solidify. The bulk of the water is decanted, and the remaining solid fraction is dissolved in hot absolute ethyl alcohol. Upon cooling, the dissolved solid crystallizes. The crystals are separated by filtration and air dried, yielding 47 grams of 2-benzyl-4-chloro-6-pyrrolidinylmethylphenol as crystalline needles, M.P. 68–69° C. Recrystallization from absolute ethyl alcohol does not change the melting point. Analysis shows 4.6% nitrogen against 4.6% calculated for $C_{18}H_{20}ClNO$.

Five grams of the free base are dissolved in ether, and dry hydrogen chloride gas is sparged therein until the solution is acidic. A white precipitate forms and is separated by filtration. The precipitate is washed well with ether and air dried, yielding 5.7 grams of the hydrochloride salt. A first recrystallization from ethyl acetate produces crystal platelets, M.P. 189.5–190.5° C. A second recrystallization from ethyl acetate, with a filtering step from hot ethyl acetate, also yields crystalline platelets, M.P. 190–191° C. Analysis shows 10.6% ionic chlorine against a calculated 10.5% for $C_{18}H_{21}Cl_2NO$ (2-benzyl-4-chloro - 6 - pyrrolidinylmethylphenol hydrochloride).

EXAMPLE II

*2-benzyl-4-chloro-6-(4-methyl-piperazinylmethyl) phenol dihydrochloride*

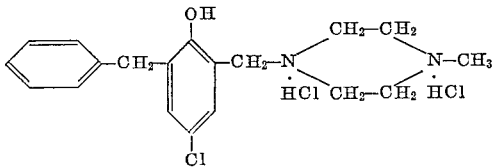

To a suitable reactor there are added 21.9 grams (0.1 mol.) of o-benzyl-p-chlorophenol, 3.3 grams (0.11 mol.) of paraformaldehyde, 11.0 grams (0.11 mol.) of N-methyl piperazine, and 50 ml. of absolute ethyl alcohol. The mixture is heated gently to reflux temperature and held there for 18 hours. The mixture is then poured over ice, and a fraction thereof forms a viscous oil. The oil is separated from the water by decantation and dried. The oil is then dissolved in ethanol, and hydrogen chloride gas is passed into the solution until acidic. Ether is then added to the solution until the cloudy point is reached, at which time the cloudy solution is gently heated on a steam bath. A precipitate forms. The reaction mixture is cooled in an ice bath, and thereafter the solid is removed by filtering and air dried. A yield of 7.0 grams of 2 - benzyl-4-chloro-6-(4-methylpiperazinylmethyl)phenol dihydrochloride, M.P. 227–231° C., is obtained. The solid is purified by refluxing with 200 ml. of ethyl acetate, and separated therefrom by filtration, yielding a purified product showing an M.P. 231–232° C.

EXAMPLE III

*2-benzyl-4-chloro-6-piperidinylmethylphenol*

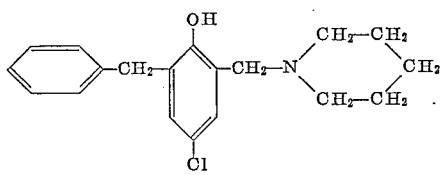

To a suitable reactor there are added 43.8 grams (0.2 mol.) of o-benzyl-p-chlorophenol, 6.6 grams (0.22 mol.) of paraformaldehyde, 18.7 grams (0.22 mol.) of piperidine, and 100 ml. of absolute ethyl alcohol. The reaction mixture is heated to gentle reflux and held there for 18 hours. The reaction mixture, while hot, is poured over 400 grams of ice, causing a fraction of the reaction mixture to solidify. The solid fraction is removed by filtration, washed with water, and thereafter dissolved in hot absolute ethanol. The solution is allowed to cool and stand at room temperature. There is formed 9.0 grams of 2-benzyl-4-chloro-6-piperidinylmethylphenol as a dark, oily substance which solidifies upon further cooling and is separated by decanting the ethyl alcohol. The decanted solution is further cooled on an ice bath. A solid precipitate forms, light tan in color, and is removed by filtration and air dried, yielding 44.0 grams of 2-benzyl-4-chloro-6-piperidinylmethylphenol, M.P. 83–84° C. The total yield is 53.0 grams of 2-benzyl-4-chloro-6-piperidinylmethylphenol, or 85% theoretical.

Following the procedure as outlined in Examples I–III, other o-benzyl-p-chlorophenol condensation products and their acid salts are readily prepared. Such other representative derivatives include:

2 - benzyl - 4 - chloro-6-(2-methyl-5-ethyl-morpholinomethyl)phenol,

2 - benzyl-4-chloro-6-(2,3-dimethylmorpholinomethyl) phenol hydrochloride,

2 - benzyl - 4-chloro-6-(4-ethyl-piperidinylmethyl)phenol,

2 - benzyl - 4 - chloro - 6-(3-methyl-piperazinylmethyl) phenol,

2 - benzyl - 4-chloro-6-(2,3-diethyl-piperazinylmethyl) phenol,

2 - benzyl-4-chloro-6-(3-ethyl-pyrrolidinylmethyl)phenol,

2 - benzyl-4-chloro-6-(3,4-dimethyl-pyrrolidinylmethyl)phenol,

2 - benzyl 4 - chloro-6-(2-ethyl-4-methyl-pyrrolidinylmethyl)phenol, and the like.

It has been found that the 2-benzyl-4-chloro-6-heterocyclicaminomethyl phenols and their acid salts exhibit pesticidal activity, particularly as herbicides and fungicides. The activity of said compounds is determined according to the following procedures:

Herbicides—pre-emergent

Aluminum pans are filled level with a good grade of top soil which has been screened through ¼″ wire mesh. The soil surface is then compacted to a depth of ⅜″ from the top of the pan. A predetermined number of seeds of each of morning glory, wild oats, brome grass, rye grass, buckwheat, radish, sugar beet, cotton, corn, foxtail, barnyard grass, crab grass, field bindweed, pigweed, wild buckwheat, tomato, and sorghum are scattered on the soil surface and covered with soil to the pan top.

The soil top is then sprayed with an aliquot of an organic solvent containing the chemical to be tested. The tests are made at rates equivalent to 25 pounds per acre and 5 pounds per acre. After spraying, the pans are placed on sand in a bench in a greenhouse, and the bench is flooded with water to ½″ above the sand level. The pans of soil are permitted to absorb moisture through perforations in the pan bottoms until the surface is about ½ moist. The excess water is then drained from the bench. The surface of the test pans rapidly becomes completely moist through capillary action. They are maintained in this condition by sub-irrigation for a two-week period. At the end of said period, the number of plants of each species which germinated and grew are counted.

Herbicides—contact

To determine the herbicidal contact activity of the subject class of compounds, a number of flats are prepared containing 21-day-old specimens of various grasses and broadleaf plants. The compounds to be tested are either dissolved in a suitable solvent and sprayed onto plants, or are applied to the plants in a dispersion of wettable dust base consisting of a wetting agent and some diluent like a clay plus an amount of water to provide the desired fluidity for spraying. Fourteen days after application of a test compound, the condition of the plants is noted. The quantity of each compound utilized is dependent upon the concentration of the contact dispersion or solution and the rate of application. It is understood, of course, that the formulation applied is sufficient to adequately "wet" the growing plant and plant parts with an effective amount of the active compound. The amount of active compound applied generally ranges from 0.18 pound per acre to 9.0 pounds per acre.

In a representative test, 2-benzyl-4-chloro-6-pyrrolidinylmethylphenol shows good activity as a herbicide when applied as a pre-emergent at the rate of 25 pounds per acre, and a solution, dispersion, or compound containing 0.5% of 2-benzyl-4-chloro-6-pyrrolidinylmethylphenol shows good herbicidal contact activity when sprayed on growing plants and plant parts.

*Fungicide—foliage protectant*

To determine the fungicidal activity, as, for example, against tomato leaf spot caused by *Alternaria solani*, a selected chemical is dissolved or dispersed in a liquid carrier, such as water or other suitable liquid. The active ingredient can be in the form of a solution, suspension, dispersion, or emulsion in aqueous or non-aqueous medium. Desirably 0.01 to 1.0% of a surface active agent by weight is included in the liquid composition. The formulation is spray applied to the foliage of four-week-old tomato plants. Twenty-four hours later, a standardized inoculum, in the form of conidial spores of *Alternaria solani*, is sprayed on the tomato plants. The plants are then incubated for 24–48 hours in a constant temperature-humidity chamber, and transferred to a greenhouse where readings are made at appropriate times. In a representative test, 2-benzyl-4-chloro-6-piperidinylmethylphenol shows good fungicidal activity against *Alternaria solani* when applied at a concentration of 0.03%, with negligible phytotoxicity toward the tomato plant.

In connection with all of the test data presented, it should be noted that controls were also run with untreated soil surfaces and unsprayed plants. At the end of the 14-day period, the growth and/or development is observed to determine whether or not development is normal.

Although the compounds of this invention are useful per se as pesticidal agents, it is preferred to apply said compounds to the plant parts and/or the plant-growing medium in a dispersed form with suitable extending agent. The term "dispersion" is used herein in its widest sense, meaning the compound particles may be molecular in size and held in true solution, or the compound particles may be colloidal in size and distributed throughout a liquid phase in the form of a suspension or emulsion, or the compound particles may be distributed throughout a solid carrier providing a mixture in particulate form, e.g., pellets, granules, powders, dusts, and the like.

As used herein, the term "extending agents" connotes any and all of those substances in which the compounds of this invention are dispersed. It includes, therefore, the solvents of a true solution, the liquid phase of suspensions or emulsions, and the solid phase of particulate solids, e.g., pellets, granules, dusts, and powders.

The formulations containing the compounds of this invention, whether in the form of solids or liquids, for most applications may also include a surface-active agent of the kind sometimes referred to in the art as a wetting, dispersing, or emulsifying agent. These agents will be referred to hereinafter more simply as surface-active agents which impart to compositions the ability to be easily dispersed in an aqueous solution.

The surface-active agents employed can be of the anionic, cationic, or non-ionic type. The preferred surface-active agents are the water-soluble anionic and water-soluble non-ionic agents. Suitable surface-active agents are set forth in U.S. 3,037,904.

The amount or percentage of active ingredient is, of course, added to a formulation in an amount sufficient to exert the desired pesticidal action. The amount of formulation utilized varies with the pesticidal activity of the selected compound, the purpose for which the application is being made (i.e., whether for short-term or long-term activity), the manner of application, the particular pesticidal effect desired, and like variables. If the formulation is to be applied as spray or dust, the percentage of active ingredient can vary from about 0.1% to nearly 100% by weight of the applied formulation. It must be understood that determination of the proper rate in any given instance is conventional procedure to those skilled in the art of pesticidal agents.

In preparing formulations containing the above class of compounds, it may be preferred to utilize an acid salt rather than the free base. For example, the hydrochloride salt of the subject class of compounds is generally more soluble in water than the corresponding base compound. Thus, if an aqueous formulation is desirable, the acid salts of the subject class of compounds can generally be utilized.

While this invention has been described with respect to certain specific embodiments, it is not so limited. It is to be understood that variations and modifications thereof may be made without departing from the spirit and scope of this invention.

The embodiments of the invention in which an exclusive property or privilege is claimed are defined as follows:

1. A method for controlling plant growth comprising applying to soil at a rate of about 0.1 to 25 pounds per acre of a compound having the formula

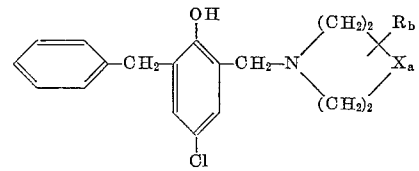

where R is selected from the group consisting of methyl and ethyl, $b$ is an integer from 0 to 2, X is selected from the group consisting of oxygen, N—CH$_3$, and CH$_2$, $a$ is an integer from 0 to 1, and the hydrochloric acid salts thereof.

2. A method for controlling plant growth comprising applying to soil 2-benzyl-4-chloro-6-pyrrolidinylmethylphenol at a rate of 0.1 to 25 pounds per acre.

3. A method for controlling the growth of fungi comprising applying to growing plants and plant parts a fungicidally toxic dispersion containing from 0.01% to 1.0% of a member selected from the group consisting of the compounds having the formula

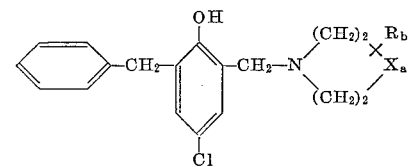

where R is selected from the group consisting of methyl and ethyl, $b$ is an integer from 0 to 2, X is selected from the group consisting of oxygen, N—CH$_3$, and CH$_2$, $a$ is an integer from 0 to 1, and the hydrochloric acid salts thereof.

4. A method for controlling the growth of fungi comprising applying to growing plants and plant parts a fungicidally toxic dispersion containing 2-benzyl-4-chloro-6-piperidinylmethylphenol at a concentration of from 0.01% to 1.0%.

(References on following page)

References Cited by the Examiner

UNITED STATES PATENTS

| | | | |
|---|---|---|---|
| 2,040,039 | 5/1936 | Brunson | 260—247.7 |
| 2,284,118 | 5/1942 | Bock | 260—268 |
| 2,363,134 | 11/1944 | McCleary | 260—326.5 |
| 2,703,324 | 3/1955 | Binkley | 167—33 X |
| 3,077,470 | 2/1963 | Burckhalter | 260—294.7 X |

OTHER REFERENCES

Wheatley et al., J. Am. Chem. Soc., vol. 79, pages 747–749 (1957).

LEWIS GOTTS, *Primary Examiner.*

JAMES O. THOMAS, *Examiner.*